United States Patent [19]
Ting

[11] Patent Number: 5,930,746
[45] Date of Patent: Jul. 27, 1999

[54] PARSING AND TRANSLATING NATURAL LANGUAGE SENTENCES AUTOMATICALLY

[75] Inventor: Hian Ann Ting, Singapore, Singapore

[73] Assignee: The Government of Singapore, Singapore, Singapore

[21] Appl. No.: 08/694,697

[22] Filed: Aug. 9, 1996

[30] Foreign Application Priority Data

Mar. 20, 1996 [SG] Singapore ............................. 9606424

[51] Int. Cl.$^6$ .................................................. G06F 17/28
[52] U.S. Cl. ................................................... 704/9; 704/2
[58] Field of Search ................................. 704/1, 9, 2, 4, 704/7; 707/530, 531, 536

[56] References Cited

U.S. PATENT DOCUMENTS

| | | | |
|---|---|---|---|
| 4,887,212 | 12/1989 | Zamora et al. | 704/8 |
| 5,146,405 | 9/1992 | Church | 704/9 |
| 5,477,451 | 12/1995 | Brown et al. | 704/9 |
| 5,510,981 | 4/1996 | Berger et al. | 704/2 |
| 5,519,608 | 5/1996 | Kupiec | 704/9 |
| 5,642,522 | 6/1997 | Zaenen et al. | 707/532 |
| 5,696,962 | 12/1997 | Kupiec | 1/1 |

*Primary Examiner*—Forester W. Isen
*Assistant Examiner*—Patrick N. Edouard
*Attorney, Agent, or Firm*—Stoel Rives LLP

[57] ABSTRACT

A sentence of a natural language is automatically parsed by: defining a set of coded tags each corresponding to a respective part-of-speech of a word in a sentence of the language; building a small corpus of sentence dependency structures by annotating with the corresponding coded tags the words in each sentence of a set of sentences having respective exemplary dependency structures to obtain a set of sequences of coded tags representing the dependency structures; determining the statistical parameters of a corpus-based statistical tool, such as a hidden Markov model, from the corpus of sentence dependency structures; tagging the words of an input sentence to be parsed with the corresponding coded tags to obtain a sequence of coded tags to derive therefrom the most probable dependency structure for the input sentence; and generating a dependency parse tree of the sentence from the derived dependency structure and the words of the input sentence. The invention finds particular application in the automatic translation of a first natural language into a second language.

52 Claims, 3 Drawing Sheets

PARSING AND TRANSLATING NATURAL LANGUAGE SENTENCES AUTOMATICALLY

TECHNICAL FIELD

This invention relates to a method and machine for parsing natural language sentences and to an automatic translation method and apparatus employing the parsing method and machine.

BACKGROUND OF THE INVENTION

The act of parsing a sentence of a natural language involves resolving the sentence into its components parts and determining the structural relationships amongst the words from which the sentence is constructed. As is well known in the theory of language, there are two main syntactic structures: the constituent structure and the dependency structure of a sentence.

Although considerable progress has been made in the linguistic theories of parsing and grammars, the problem of automatically parsing natural language text by machine has still not yet been satisfactorily solved. This is largely due to the fact that people use a natural language in a free and creative way.

Previous attempts to devise an automatic parsing machine for natural languages have been mostly rule-based. A pre-requisite of a rule-based system is a set of language dependent rules written and refined by linguists over many years. For a rule-based parsing machine to work, the rules of the particular language have to be identified and incorporated into the system. Writing grammar rules for rule-based parsing machines is a daunting task that only computational linguists can effectively perform. in devising such rule-based systems, it has been necessary to formalize the grammar in systems such as the generalized context-free grammar formalism and the tree-adjoining grammar formalism.

SUMMARY OF THE INVENTION

It is an object of the present invention to provide a method and machine for parsing natural language sentences which does not involve formalized rules of grammar.

Accordingly, to this end, the present invention provides a method of automatically parsing a sentence of a natural language, comprising: defining a set of coded tags each corresponding to a respective part-of-speech of a word in a sentence of the language; building a corpus of sentence dependency structures by annotating with the corresponding coded tags the words in each sentence of a set of sentences having respective exemplary dependency structures to obtain a set of sequences of coded tags representing the dependency structures; determining the statistical parameters of a corpus-based statistical tool from the corpus of sentence dependency structures; tagging the words of an input sentence to be parsed with the corresponding coded tags to obtain a sequence of coded tags representing the input sentence; applying the corpus-based statistical tool to the sequence of coded tags to derive therefrom the most probable dependency parse tree of the sentence from the derived dependency structure and the words of the input sentence.

In another aspect, the invention provides a machine for parsing a sentence of a natural language, comprising: a coder defining a set of coded tags each corresponding to a respective part-of-speech of a word in a sentence of the language; a corpus-based statistical tool having statistical parameters determined from a corpus of sentence dependency structures formed by annotating with the corresponding coded tags the words in each sentence of a set of sentences having respective exemplary dependency structures; a tagger for tagging the words of a sentence to be parsed with the corresponding coded tags to obtain a sequence of coded tags representing the input sentence; a processor for applying the corpus-based statistical tool to the sequence of coded tags to derive therefrom the most probable dependency structure for the input sentence and to generate a dependency parse tree of the sentence from the derived dependency structure and the words of the input sentence.

Such a parsing machine is accurate, capable of processing sentences written in various styles, robust, easy for non-linguists to build, fine-tune and maintain, and fast.

In a further aspect, the invention provides a method of automatically translating a first natural language into a second language, comprising converting a spoken or written text in the first language into electrical signals representing the spoken or written words; rendering the text into sentences; processing each sentence by an automatic parsing method according to the invention to generate a dependency parse tree for the sentence; synthesizing a sentence in the second language based on the words and the derived dependency tree of the sentence in the first language; and audibly or visually reproducing the synthesized sentence in the second language.

In yet another aspect, the invention provides an apparatus for automatically translating a first natural language into a second language, comprising: a converter for converting a spoken or written text in the first language into electrical signals representing the spoken or written words; means for rendering the text into sentences; an automatic parsing machine according to the invention for processing each sentence to generate a dependency parse tree for the sentence; a synthesizer for synthesizing a sentence in the second language based on the words and the derived dependency tree of the sentence in the first language; and a reproduction device for audibly or visually reproducing the synthesized sentence in the second language.

Additional objects and advantages of this invention will be apparent from the following detailed description of preferred embodiments thereof which proceeds with reference to the accompanying drawings.

BRIEF DESCRIPTION OF THE DRAWINGS

In order that the invention may be more readily understood, an embodiment thereof will now be described, by way of example, with reference to the accompanying drawings, in which.

DETAILED DESCRIPTION OF THE PREFERRED EMBODIMENT

Figure 1:
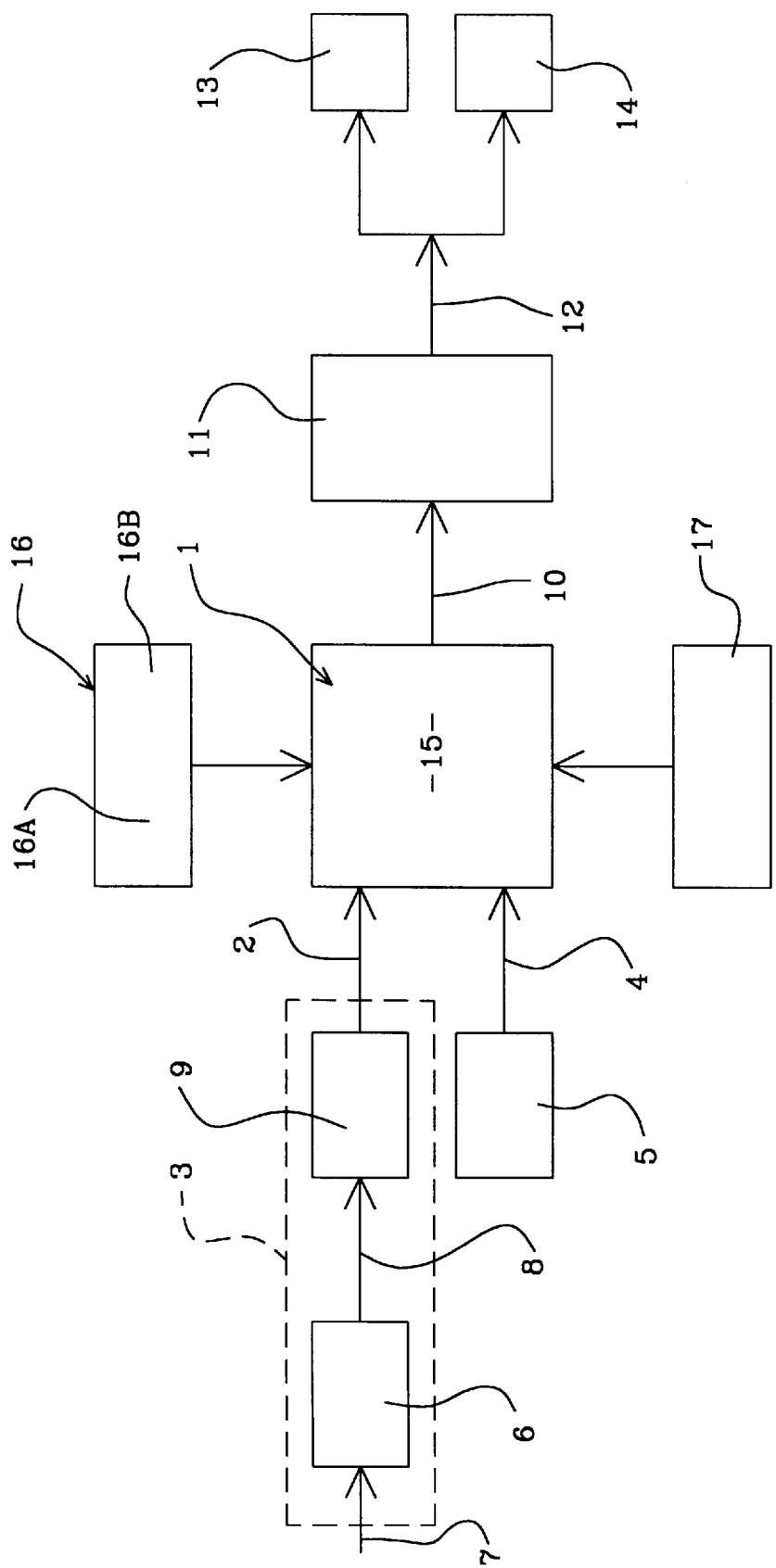
FIG. 1 is a block diagram illustrating an automatic language translation apparatus embodying the present invention.

Referring firstly to FIG. 1, an automatic translation apparatus embodying the present invention for translating a first natural language A into a second language B comprises a natural language parsing machine 1 embodying the present invention. An audio language input 2 of the parsing machine 1 is connected to the output of a speech input module 3 and a visual input 4 of the parsing machine 1 is connected to a visual language input module 5. The audio module 3 comprises an audio input unit 6 having a microphone for capturing the spoken text in language A received at input 7 and converting the spoken words into electrical signals. The electrical signal representing the spoken words are converted into digital speech signals which are delivered to the input 8 of a speech recognition unit 9 which analyses the signals received from the audio input unit 6 and delivers to the input 2 of the parsing machine 1 a sequence of digital language signals each representing a sentence in the spoken text captured at the input 7 of the unit 6.

The visual input module 5 connected to the visual input 4 of the parsing machine 1 is an optical character reader of known form adapted to scan a document written in the language A and to deliver digital language signals representing the written text including the punctuation thereof.

A sentence presented to the parsing machine on either of the inputs 2 and 4 in the form of a digital language signal is analyzed to determine the dependency structure which exists between the words from which the sentence is composed. A corresponding output signal representing the determined dependency structure of the sentence at the output 10 of the parsing machine. The output signal at output 10 represents the words of the sentence together with data interrelating the words within the determined dependency structure of the sentence. This output signal is fed to the input of a language generator 11 which generates a sentence in a second language B corresponding to the sentence in language A, the word content and dependency relationship of which is specified by the output signal at output 10. An electrical language signal corresponding to the generated sentence in language B is delivered at the output 12 of the language generator 11 which is connected to an audio speech synthesizer 13 and/or a written text generating device 14, whereby the synthesized sentence in language B is reproduced in audible and/or visual form.

As illustrated in FIG. 1, the parsing machine comprises a central processing unit (CPU) 15, tagging means 16 for tagging each of the words in an input sentence of the natural language A with a coded tag identifying the corresponding part-of-speech of the word in the sentence to produce a sequence of coded tags representing the sentence, and a predetermined corpus-based statistical tool 17 for use by the CPU 15 in analyzing the sequence of coded tags representing the sentence to determine the generalized dependency structure of the sentence from the sequence of coded tags and for generating a dependency parse tree of the words of the input sentence.

The tagging means 16 comprises a part-of-speech memory 16A storing a language-dependent part-of-speech corpus composed of words in the language A associated with their corresponding coded tags and a statistical tagger 16B for tagging each word of the input sentence with the corresponding coded tag identifying the part-of-speech of that word in the input sentence. The tagger 16B incorporates a rare word model for tagging unknown words. The statistical tagger is based on a first-order HMM model developed from an annotated Penn Treebank version of Brown Corpus and WSJ Corpus.

The list below reveals that part-of-speech categories we used. There are 48 of them. The first column is the mnemonic while the second column is the one-letter ASCII code of the part of speech. For coding convenience, the one-letter ASCII code begins from the printable ", i.e. character 34 to character 81. We used character 33! for padding.

```
CC    " /* Coordinating conjunction */
CD    # /* Cardinal number */
DT    $ /* Determiner */
EX    % /* Existential 'there' */
FW    & /* Foreign word */
IN    ' /* Preposition or subordinating conjunction */
JJ    ( /* Adjective */
JJR   ) /* Adjective, comparative */
JJS   * /* Adjective, superlative */
LS    + /* List of item marker */
MD    , /* Modal */
NN    - /* Noun, singular or mass */
NNS   . /* Noun, plural */
NP    / /* Proper noun, singular */
NPS   0 /* Proper noun, plural */
PDT   1 /* Predeterminer */
POS   2 /* Possessive ending */
PP    3 /* Personal pronoun */
PP$   4 /* Possessive pronoun */
RB    5 /* Adverb */
RBR   6 /* Adverb, comparative */
RBS   7 /* Adverb, superlative */
RP    8 /* Participle */
SYM   9 /* Symbol */
TO    : /* 'to' */
UH    ; /* Interjection */
VB    < /* Verb, base form */
VBD   = /* Verb, past tense */
VBG   > /* Verb, gerund or present participle */
VBN   ? /* Verb, past participle */
VBP   @ /* Verb, non-3rd person singular present */
VBZ   A /* Verb, 3rd person singular present */
WDT   B /* Wh-determiner */
WP    C /* Wh-pronoun */
WP$   D /* Possessive wh-pronoun */
WRB   E /* Wh-adverb */
"     F /* Straight double quote */
$     G /* Dollar sign */
#     H /* Pound sign */
'     I /* Left single quote */
,     J /* Right single quote */
"     K /* Left double quote */
"     L /* Right double quote */
(     M /* Left parenthesis (round, square, curly or angle bracket) */
)     N /* Right parenthesis (round, square, curly or angle bracket) */
,     O /* Comma */
.     P /* Sentence-final punctuation */
:     Q /* Mid-sentence punctuation */
```

The corpus-based statistical tool 17 used in the parsing machine 1 is language-independent and the parsing machine 1 is calibrated for a particular language by manually tagging a small corpus (e.g. 2000 sentences) of dependency structures in the particular natural language A. This corpus of dependency structures is then used to estimate the statistical parameters of a first-order double-layer hidden Markov model (HMM) for parsing the dependency structure of sentences in the chosen language. A small sample of the dependency structures in the corpus is given in the list below.

| #D77 | |
|---|---|
| IN  | If 1 → 10 - |
| PP  | you 2 → [SUB |
| VBP | need 3 → 1 ] |
| DT  | the 4 → 5 [ |
| NP  | BIB 5 → 3 + |
| NN  | information 6 → 3 +OBJ |
| ,   | , 7 → 6 ] |
| PP  | you 8 → 10 [SUB |

-continued

| | #D77 | |
|---|---|---|
| MD | can | 9 → 10 ] |
| VB | create | 10 → 22 - |
| DT | a | 11 → 14 [ |
| VBN | saved | 12 → 14 + |
| NN | BIB | 13 → 14 + |
| NN | list | 14 → 10 +OBJ |
| CC | and | 15 → 10 ] |
| VB | print | 16 → 15 - |
| PP | it | 17 → 16 [ |
| RP | out | 18 → 16 ] |
| WRB | when | 19 → 16 - |
| PP | you | 20 → 21 [SUB |
| VBP | like | 21 → 19 ] |
| . | . | 22 → 0 - |
| | #L30 | |
| NP | Ami | 1 → 2 [ |
| NP | Pro | 2 → 3 +SUB |
| VBZ | provides | 3 → 10 ] |
| JJ | additional | 4 → 6 [ |
| NN | mouse | 5 → 6 + |
| NNS | shortcuts | 6 → 3 +OBJ |
| IN | for | 7 → 6 ] |
| VBG | selecting | 8 → 7 - |
| NN | text | 9 → 8 [OBJ |
| . | . | 10 → 0 ] |
| | #T18 | |
| DT | The | 1 → 5 [ |
| " | " | 2 → 3 + |
| NN | View | 3 → 5 + |
| " | " | 4 → 3 + |
| NN | tab | 5 → 11 + |
| IN | in | 6 → 5 ] |
| NP | Word | 7 → 8 [ |
| POS | 's | 8 → 9 + |
| NNS | Options | 9 → 10 + |
| VBP | dialog | 10 → 6 ] |
| . | . | 11 → 0 - |

The first field in each line is the part of speech (see part-of-speech categories list on pages 5–7), the second field is the word, the third is the serial number of the word, the fourth is an arrow denoting the attachment of the word to the fifth field, which is the serial number of its governor. For example, in the first sentence, the word number 1 "If" is attached to word number 10 "create". It is apparent that there is a one-to-one mapping from this scheme of representing the dependency structure to the dependency parse tree. As a convention, the end-of-sentence punctuation is attached to word number 0, which means that it does not depend on anything in the sentence. This scheme of coding the dependency structure of the sentence makes it easy for human to annotate or verify; one just need to edit the serial number of the governor of each word.

The sixth field of each line is the atomic noun phrase symbol associated to each location of the sentence. There are 5 noun phrase symbols defined as follows:

[: start of noun phrase.
]: end of noun phrase.
": end and start of two adjacent noun phrases.
+: inside the noun phrase.
-: outside the noun phrase.

A conventional and perhaps more intuitive look of these symbols will be to write the sentence horizontally and then shift each symbol by half a word to the left and omit the + and -. For example: [ Ami Pro ] provides [ additional mouse shortcuts ] for selecting [ text ].

The seventh field of each line is the argument of the predicate to which it is attached. We use SUB to indicate subject, OBJ is object, S_SUB is surface subject, L_SUB is the logical subject, and I_OBJ is the indirect object.

The dependency structure coded in this manner is equivalent to a dependency tree. Another way of representing the same structure is via the tuple of (h, b), where h is the POS of the governor, and b is the relative offset of the governor. In other words, instead of using the serial number, the governor of each word is represented as (h, b). We use (h, b) as the state of the eHMM when parsing the dependency structure.

Figure 2:
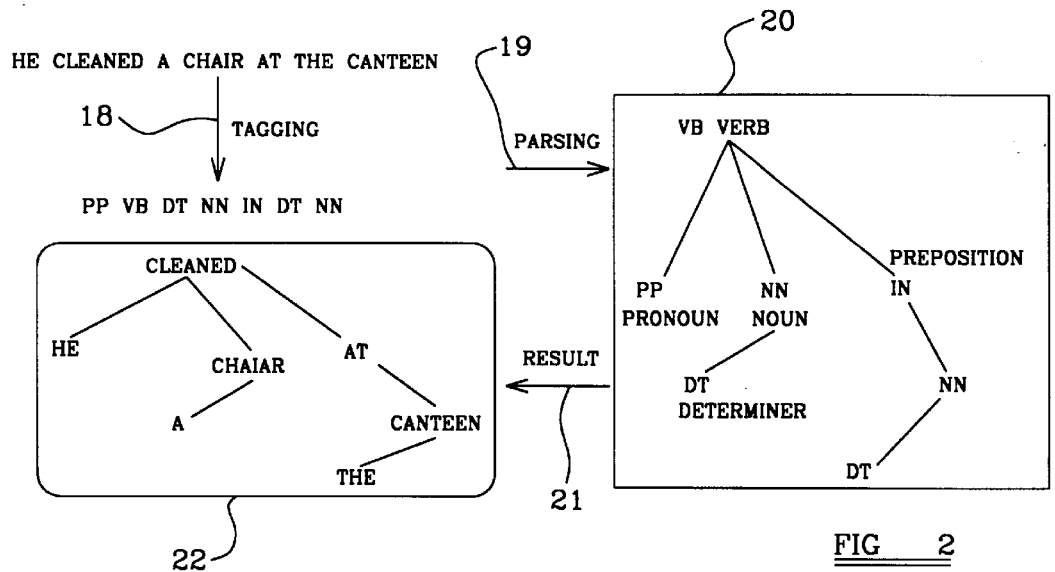
FIG. 2 is an overview of the operation of a parsing machine incorporated in the automatic translation apparatus of FIG. 1.

FIG. 2 illustrates in outline the processing of the input English language sentence "He cleaned a chair at the canteen" by a parsing machine 1 embodying the invention and provided with a part-of-speech corpus of the English language in memory 16A and a statistical tool 17 having statistical parameters determined by a small corpus (for example 1618 sentences) of dependency structures of English sentences.

In a first stage 18 of the process, the words of the input sentence are sequentially assigned respective coded tags corresponding to the part-of-speech of the word in the sentence. Thus, the pronoun "he" is assigned the code PP, the verb "cleaned" is assigned the code VB, the indefinite article "a" is assigned the code DT (determiner), the noun "chair" is assigned the code "NN", the preposition "at" is assigned the code IN, the definite article "the" is assigned the code DT and the noun "canteen" is assigned the code NN. With the component words of the sentence thus tagged, the sentence is represented by the sequence of codes PP VB DT NN IN DT NN.

This sequence of codes is then analyzed in a second stage 19 according to the predetermined HMM model to derive the most probable generalized dependency structure of the input sentence in terms of the parts of speech contained in the sentence as indicated in the box 20 in FIG. 2. The sentence is then reconstituted in a third stage 21 by substituting the corresponding words of the sentence for the codes in the determined dependency structure in order to derive the dependency parse tree for the input sentence as shown in box 22 of FIG. 2.

Figure 3:
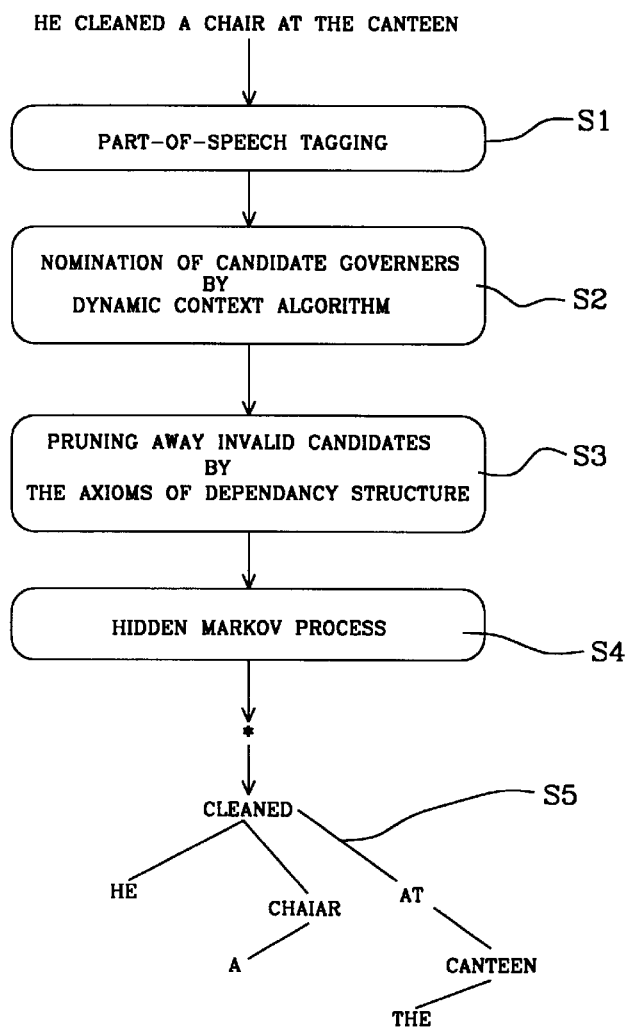
FIG. 3 is a basic flow chart illustrating the operation of the parsing machine.

The parsing of the English sentence "He cleaned the chair at the canteen" by the parsing machine 1 is illustrated in further detail in the flow chart of FIG. 3. In step S1, each of the words of the input sentence is tagged with the coded tag corresponding to the part-of-speech of that word. In step S2, a dynamic context algorithm is applied to the sequence of coded tags representing the sentence in order to nominate candidate governors in the structure of the sentence. In step S3, invalid candidate governors are eliminated by comparing the nominated governors with a set of language-independent axioms of dependency structure. The remaining candidate governors are then statistically processed in step S4 by means of the hidden Markov model 17 having the predetermined statistical parameters for the English language in order to identify the most probable dependency structure amongst the remaining candidate structures. The most probable dependency structure identified by the hidden Markov process is then presented as the dependency parse tree of the sentence in step S55.

The set of language-independent axioms applied to the candidate dependency structures in step S3 of the process of FIG. 3 is as follows:

Axiom A: each word depends on one and only one word in the same sentence.

Axiom B: no word except the end of sentence punctuation can depend on itself.

Axiom C: dependency structure is non-cyclic.

Axiom D: dependency structure is non-crossing.

Axiom E: a sentence can have at most one main verb.

Axiom F: a word used as a conjunction or preposition cannot constitute a leaf of the dependency tree.

Figure 4:
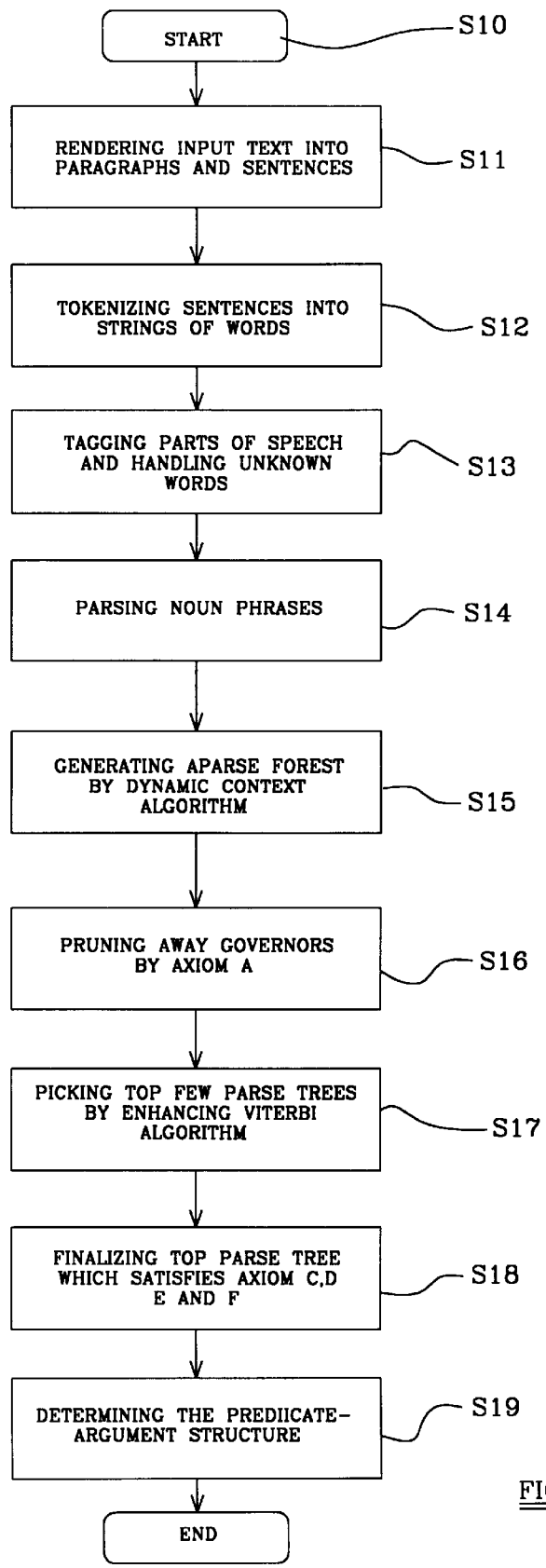
FIG. 4 is a more detailed flow chart illustrating the operational steps carried out by the parsing machine.

FIG. 4 is a detailed flow chart illustrating in more detail the operation of the parsing machine 1 embodying the invention in parsing an input sentence.

The process is initiated by a starting step S10 which initiates a first operating step S11 which serves to render an input text into paragraphs and sentences using a set of known procedures. Thus, the whole text is read into the system line by line. Then, the paragraph boundaries are determined by determining whether there is an empty line between successive lines containing words. Each paragraph thus determined is rendered into sentences by locating within the paragraph the punctuation marks denoting the end of a sentence, i.e. full stops, question marks and exclamation marks. In order to avoid drawing erroneous sentence boundaries, the context of a located punctuation mark is compared with a list of exceptions, such as Mr., Dr. and initials in names, and the punctuation mark is disregarded if its context matches an exception on the list.

The sentences isolated in step S11 are then tokenised in step S12 into strings of words.

Step S12 is a rule-based routine to separate commas, dashes and other punctuation marks within a sentence from the words to which they are attached.

In step S13, each word of the sentence is tagged with a coded tag corresponding to the part-of-speech of that word and unknown words not contained in the part-of-speech corpus memory 16A are allocated a most probable coded tag by a rare word model in the statistical tagger 16B.

The rare word module in the statistical tagger 16B is a corpus-based, statistical approach which models the occurrences of unknown words with respect to part-of-speech tagging. This approach uses rare words in the corpus as unknown words. In addition, the concept of score is used in place of frequency count in, the estimation of conditional probability. The part-of-speech contextual information of rare words is coded from the corpus, and a dynamic string matching algorithm is employed to retrieve the contextual information for disambiguating the parts-of-speech of unknown words.

An easy way of handling an unknown word would be to let it have equal probability over all possible part-of-speech categories. This would result in the unknown word having maximum perplexity, $N_t$, which is the total number of part-of-speech categories. Perplexity is defined, as the average number of possible choices that are for a random variable. If the random variable is uniformly distributed, then it has maximum perplexity, which is the total number of possible choices. The more choices there are, the more difficult it is to select the right one.

One of the main functions of the corpus is to lower the perplexity of each word. For example, consider a known word "y" which appears once as FW, twice as NN, three times as NP and twice as PP. It is never used as other part-of-speech categories. In the absence of the Brown Corpus, the perplexity of "y" is $N_t$=48. However, once the histogram information is extracted from the Corpus, the Shanon entropy H of "y" can be calculated as $$H(y) \equiv -\sum_{\tau=1}^{N_t} P(t^\tau|y)\log P(t^\tau|y) \qquad (1)$$
$$= -\left(\frac{1}{8}\log_2\frac{1}{8} + \frac{2}{8}\log_2\frac{2}{8} + \frac{3}{8}\log_2\frac{3}{8} + \frac{2}{8}\log_2\frac{2}{8}\right)$$
$$= 1.91$$

The perplexity J of "y" is much lower now:

$$J(y)=2^{H(y)}=2^{1.91}=3.76 \qquad (2)$$

The Corpus thus gives a much better chance of guessing correctly the part-of-speech of "y", 1/3.76 against the initial 1/48. Roughly speaking, the Corpus allows the number of choices to be narrowed from 48 to 3.76. The Corpus thus permits the reduction of perplexity for known words and can also reduce the perplexity of unknown words in the following manner.

From the Corpus, the number of times a part-of-speech category occurs is counted. Then the statistical parameters P ($t^\tau$) are estimated. Using these parameters, in fact one obtains a better way to model the statistical profile of an unknown word $\mho$. Calculating the perplexity of an unknown word based on this set of parameters gives:

$$H(\mho) = -\sum_{\tau=1}^{48} P(t^\tau)\log_2 P(t^\tau) = 4.36, \qquad (3)$$

$$J(\mho) = 20.51 \qquad (4)$$

Knowing how often a part-of-speech tag occurs, i.e. knowing P ($t^\tau$) from the Corpus, the chance improves to 1/20.51, as opposed to 1/48 corresponding to uniform distribution of P ($t^\tau$)=1/48.

The odds of disambiguating the part-of-speech of an unknown word is further improved in the rare word model by modeling it as rarely occurring word in the Corpus. Rare words are defined as those words that are used only once with respect to a particular part-of-speech in the Corpus. For example, assume the word "y" is a rare word with respect to FW. Using this idea of the unknown word as a rare word, P ($t^\tau|\mho$) can be calculated, and the entropy and perplexity are as follows:

$$H(\mho)=3.31,$$
$$J(\mho)=9.89$$

This greatly improves the odds from 1/20.51 to 1/9.89. The reduction in perplexity is due mainly to the fact that the unknown word occurs more often as NN or NP. The set of parameters P ($t^\tau|\mho$) may be called a no-context model of the unknown word.

Despite the improvement, the unknown word is still very ambiguous; the entropy H ($\mho$)=3.31 is high compared to the known word such as y's H (y)=1.91. The rare word model therefore employs a representation scheme to encode the contexts in which rare words occur, and then uses the contexts to reduce the perplexities when an unknown word arises in a sentence.

Suppose a rare word $\Re$ occurs at a position i in a sentence (of length n) of the corpus, as shown below.

$$\tilde{t}_1, \tilde{t}_2, \ldots, \tilde{t}_{i-w}, \tilde{t}_{i-w+1}, \ldots, \tilde{t}_{i-1}, \tilde{t}_i, \tilde{t}_{i+1}, \ldots, \tilde{t}_{i+w-1}, \tilde{t}_{i+w}, \ldots, \tilde{t}_{n-1}, \tilde{t}_n, \quad (5)$$

The $t_i$ is the part-of-speech tagged to the word at i in the corpus. Then, the part-of-speech context of ℜ is a window of size 2w centered upon i. The contexts for all the rare words are coded and stored in a context file. Suppose now the tagger produces a string of parts of speech (of length n) for a sentence which contains an unknown word $\mho$ at position i as follows:

$$\hat{t}_1, \hat{t}_2, \ldots, \hat{t}_{i-w}, \hat{t}_{i-w+1}, \ldots, \hat{t}_{i-1}, \hat{t}_i, \hat{t}_{i+1}, \ldots, \hat{t}_{i+w-1}, \hat{t}_{i+w}, \ldots, \hat{t}_{n-1}, \hat{t}_n, \quad (6)$$

This context is matched to those in the context file and it is determined how many times t's match. In this manner, the set of parameters $P(t^\tau | \mho)$ for the unknown word becomes context-dependent and its entropy is lowered to the same order as known words. If there is no match with any of the contexts in the file, then we simply use the no-context model. With $P(t^\tau | w_i)$ for all the words, the statistical tagger tags the sentence again. In this manner, there is obtained a high-performance, robust tagger which handles unknown words well.

When the tagger indicates that a word is unknown, the system first opens a left-right context file to perform dynamic string matching. Given the contexts centered upon an unknown word, the system first counts how many times it matches a string 1-letter coded parts of speech of up to 20 characters, then 18 characters, 16, 14 and so on. The more characters it matches, the higher weight will be given to that context string. It there is at least one left-right context string that matches the input string of context, even partially, then the system does not proceed to examine the left contexts and the right contexts. On the other hand, if the system finds no partially matching left-right contexts at all, then it searches the file that contains the left contexts, and the file that contains the right contexts. In the event that even these two files do not have any partially matching contexts, then the system resorts to using the static statistical parameters $P(t^\tau | \mho)$, i.e. the no-context model of the unknown word.

For each part-of-speech $t^\tau$, a file is created and the following representation is adopted:

$r_1 r_2 r_3 r_4 r_5 r_6 r_7 r_8 r_9 r_{10}$ h b a

Here $r_i, i=1, \ldots, 10$, are the parts-of-speech on the right of $t^\tau$ in the corpus, h is the part-of-speech of the head, b is the offset by part-of-speech, and a is the offset by dependency distance. Thus, we have $N_r$ files for all the right contexts and similarly we generate $N_r$ files for all the left contexts, as well as the left-right contexts.

The parts-of-speech being known from the tagger, part-of-speech contexts are used to suggest the possible dependency tags for the word at i, rather than basing these on just $t_i$ alone. The left and right contexts provide more specific information for disambiguating the dependency tags. In short, contextual information narrows down the choices. Since the length of the left context and that of the right context can by anything from 1 to say 10, for each part-of-speech, there are possible contexts.

$$N_t^{\sum_{i=1}^{20} i} = N_t^{210}$$

Given strings of contexts from the corpus, one can define a score based on how often and how well the context in the sentence being parsed matches them. The length of string matching is dynamical in that the length is not fixed, and it varies from one word to the other in the sentence. The longer the length of string matching a particular context in the file, the higher the score for the dependency tag associated with that context. Similarly, if there are more contexts with the same dependency tag matching that of a word in the sentence being parsed, then the higher is the score of that dependency tag for the word. From the scores, one can calculate the parameters $P(h^o, b_{\mathsf{G}} | t^\tau)$ during run time, and use them to obtain (h, b).

For each part-of-speech $t^\tau$, we have 3 files that contain the left contexts, the right contexts, as well as the left-right contexts. From these files, again the system employs the dynamic string matching routine to estimate the parameters of $P(h^o, b_{\mathsf{G}} | t^\tau)$ and generate a parse forest in which each relationship has an associated score.

From the scores, the joint probabilities $P(h^o, b_{\mathsf{G}} | t^\tau)$ are calculated and the Viterbi algorithm is then used in step 17 to choose one tree out of the forest that satisfies all the axioms.

The enhanced Viterbi algorithm is a streamlined technique to arrange all the possible combinations of hidden states in the order of the likelihood of observing the input symbols.

Suppose all the parameters have been calculated, one can use these to tag new sentences automatically, be it the part-of-speech, the noun phrase marker, or the dependency tag. The Viterbi algorithm is a technique which arrives at a maximum likelihood solution in time complexity of O(n), where n is the number of words or tokens in the sentence.

Noun phrases within the sequence of coded tags representing the input sentence are parsed in step S14.

In this step, each sentence is annotated with symbols (called markers) to represent the noun phrase bracketing (see Appendix A) and is stored as columns vertically in the reformatted corpus. In this representation, each token or word in the sentence is associated with a marker. If one shifts each marker to the left by half a word, ignores the + and −, and superimposes them onto the sentence, one gets back the original sentence with its noun phrase bracketing.

The markers thus represent the noun phrase structures of the sentences in the corpus. The key idea is to view noun phrase parsing as if one is tagging the noun phrase "markers" for each word in the sentence. The hidden states are now the noun phrase markers, and the observable are the parts-of-speech. To reduce the perplexity, a dynamic context algorithm is again used to estimate the joint probabilities of the parts-of-speech and the noun phrase markers from the surrounding contexts during run time, in an analogous fashion to the way in which the dynamic context algorithm is used to disambiguate the unknown words. To enhance the performance of the system, the following axioms of noun phrase bracketing, which disallow illegal combinations of noun phrase markers, are also applied.

1. An open bracket [ at the up-stream of the sentence must have a corresponding close bracket ] down-stream.
2. A close bracket ] at the down-stream of the sentence must have a corresponding open bracket [ up-stream.
3. Within the noun phrase, the markers cannot be −.
4. Within the noun phrase, the markers cannot be +.

A parse forest of possible dependency trees is generated from the resulting information in step S15 using a dynamic context algorithm. In step S16, the axiom A of dependency structure is applied to the resulting parse forest to eliminate invalid parse trees. The enhanced Viterbi algorithm is then employed in step S17 to select a plurality of most likely parse trees, from which the most probable parse tree is, selected in step S18 by the application of axioms C, D, E and F of dependency structure.

Using the most probable parse tree as determined in step S18, the predicate-argument structure of the input sentence is constructed in step S19 and represents the dependency parse tree of the input sentence.

Axiom B forbids governance of the end-of-sentence punctuation by other words in the sentence. It is used to check and correct the typographical errors during the manual process of annotating the corpus with dependency structures.

The programs of the parsing machine may be written in Unix C and may run on a Unix platform with the following configuration:

1150 MHz IP19 Processor
CPU: MIPS R4400 Processor Chip Revision: 5.0
FPU: MIPS R4010 Floating Point Chip Revision: 0.0
Data cache size: 16 Kbytes It will be appreciated that the described parsing machine and translation apparatus are fast, accurate, robust, capable of handling vocabulary of unlimited size, capable of processing sentences written in diverse styles and easy for non-linguists to construct, fine-tune and maintain.

It will be obvious to those having skill in the art that many changes may be made to the details of the above-described embodiment of this invention without departing from the underlying principles thereof. The scope of the present invention should, therefore, be determined only by the following claims.

I claim:

1. A method of automatically parsing a sentence of a natural language, comprising: defining a set of coded tags each corresponding to a respective part-of-speech of a word in a sentence of the language; building a corpus of sentence dependency structures by annotating with the corresponding coded tags the words in each sentence of a set of sentences having respective exemplary dependency structures to obtain a set of sequences of coded tags representing the dependency structures; determining the statistical parameters of a corpus-based statistical tool from the corpus of sentence dependency structures; tagging the words of an input sentence to be parsed with the corresponding coded tags to obtain a sequence of coded tags representing the input sentence; applying the corpus-based statistical tool to the sequence of coded tags to derive therefrom the most probable dependency structure for the input sentence; and generating a dependency parse tree of the sentence from the derived dependency structure and the words of the input sentence.

2. The method according to claim 1, comprising: rendering electrical signals representing input text in the language into paragraphs and sentences; and tokenising the sentences into strings of words.

3. The method according to claim 1, comprising: storing a part-of-speech corpus consisting of words in the language associates with their corresponding coded tags; and tagging the words of the input sentence to be parsed using the part-of-speech corpus and the statistical tagger.

4. The method according to claim 3, wherein the statistical tagger is based on a first-order hidden Markov model.

5. The method according to claim 3, comprising using a dynamic context algorithm to assign a most probable coded tag to an unknown word not contained in the part-of-speech corpus.

6. The method according to claim 1, comprising determining the most probable dependency structure using a first-order double layer hidden Markov model.

7. The method according to claim 6, comprising: using a dynamic context algorithm to nominate candidate governors and generate a parse forest of dependency parse trees; pruning away invalid candidate governors; and selecting the most probable dependency structure from the remaining dependency trees.

8. The method according to claim 7, comprising pruning away the invalid governors using a first group of language-independent axioms of dependency structure.

9. The method according to claim 8, wherein the first group of axioms comprises a first axiom that each word depends on one and only one word in the same sentence and a second axiom that a word used as a conjunction or preposition cannot be a leaf of a dependency tree.

10. The method according to claim 8, comprising selecting a plurality of most likely dependency trees from the pruned forest of dependency trees using an enhanced Viterbi algorithm.

11. The method according to claim 10, comprising selecting as the most probable dependency structure that dependency tree which satisfies a second group of language independent axioms of dependency structure.

12. The method according to claim 11, wherein the second group of axioms comprises a third axiom that dependency structure is non-cyclic, a fourth axiom that dependency structure is non-crossing and a fifth axiom that a sentence can have at most one main verb.

13. The method according to claim 7, comprising extracting noun phrases from the input sentence after tagging of the input sentence and prior to generating the parse forest.

14. A machine for parsing a sentence of a natural language, comprising: a coder defining a set of coded tags each corresponding to a respective part-of-speech of a word in a sentence of the language; a corpus-based statistical tool having statistical parameters determined from a corpus of sentence dependency structures formed by annotating with the corresponding coded tags the words in each sentence of a set of sentences having respective exemplary dependency structures; a tagger for tagging the words of a sentence to be parsed with the corresponding coded tags to obtain a sequence of coded tags representing the input sentence; a processor for applying the corpus-based statistical tool to the sequence of coded tags to derive therefrom the most probable dependency structure for the input sentence and to generate a dependency parse tree of the sentence from the derived dependency structure and the words of the input sentence.

15. The machine according to claim 14, comprising an analyzer for rendering electrical signals representing input text in the language into paragraphs and sentences and for tokenising the sentences into strings of words.

16. The machine according to claim 14, comprising a first corpus memory storing a part-of-speech corpus consisting of words in the language associated with their corresponding coded tags; and a statistical tagger for tagging the words of the input sentence using the part-of-speech corpus.

17. The machine according to claim 16, wherein the statistical tagger is based on a first-order hidden Markov model.

18. The machine according to claim 16, comprising a dynamic context algorithm for assigning a most probable coded tag to an unknown word not contained in the part-of-speech corpus.

19. The machine according to claim 14, wherein the corpus-based statistical tool for determining the most probable dependency structure includes a first-order double layer hidden Markov model.

20. The machine according to claim 19, wherein a dynamic context algorithm is used to nominate candidate governors and generate a parse forest of dependency parse trees from which invalid candidate governors are pruned away, the most probable dependency structure being selected from the remaining dependency trees.

21. The machine according to claim 20, wherein the invalid governors are pruned away using a first group of language-independent axioms of dependency structure.

22. The machine according to claim 21, wherein the first group of axioms comprises a first axiom that each word depends on one and only one word in the same sentence and a second axiom that a word used as a conjunction or preposition cannot be a leaf of a dependency tree.

23. The machine according to claim 21, wherein a plurality of most likely dependency trees are selected from the pruned forest of dependency trees using an enhanced Viterbi algorithm.

24. The machine according to claim 23, wherein the most probable dependency structure is selected from the plurality of most likely dependency trees as being that dependency tree which satisfies a second group of language-independent axioms of dependency structure.

25. The machine according to claim 24, wherein the second group of axioms comprises a third axiom that dependency structure is non-cyclic, a fourth axiom that dependency structure is non-crossing and a fifth axiom that a sentence can have at most the main verb.

26. The machine according to claim 20, wherein noun phrases are extracted from the input sentence after tagging of the input sentence and prior to generating the parse forest.

27. A method of automatically translating a first natural language into a second language, comprising the steps of:

converting a spoken or written text in the first language into electrical signals representing the spoken or written words;

rendering the text into sentences;

processing each sentence by an automatic parsing method to generate a dependency parse tree for the sentence by defining a set of coded tags each corresponding to a respective part-of-speech of a word in a sentence of the language; building a corpus of sentence dependency structures by annotating with the corresponding coded tags the words in each sentence of a set of sentences having respective exemplary dependency structures to obtain a set of sequences of coded tags representing the dependency structures; determining the statistical parameters of a corpus-based statistical tool from the corpus of sentence dependency structures; tagging the words of an input sentence to be parsed with the corresponding coded tags to obtain a sequence of coded tags representing the input sequence; applying the corpus-based statistical tool to the sequence of coded tags to derive therefrom the most probable dependency structure for the input sentence; and generating a dependency parse tree of the sentence from the derived dependency structure and the words of the input sentence;

synthesizing a sentence in a second language based on the words and the derived dependency tree of the sentence in the first language; and audibly or visually reproducing a synthesized sentence in the second language.

28. The method according to claim 27, comprising rendering electrical signals representing input text in the language into paragraphs and sentences; and tokenising the sentences into strings of words.

29. The method according to claim 27, comprising storing a part-of-speech corpus consisting of words in the language associates with their corresponding coded tags; and tagging the words of the input sentence to be parsed using the part-of-speech corpus and the statistical tagger.

30. The method according to claim 29, wherein the statistical tagger is based on a first-order hidden Markov model.

31. The method according to claim 29, comprising using a dynamic context algorithm to assign a most probable coded tag to an unknown word not contained in the part-of-speech corpus.

32. The method according to claim 27, comprising determining the most probable dependency structure using a first-order double layer hidden Markov model.

33. The method according to claim 32, comprising using a dynamic context algorithm to nominate candidate governors and generate a parse forest of dependency parse trees;

pruning away invalid candidate governors; and selecting the most probable dependency structure from the remaining dependency trees.

34. The method according to claim 33, comprising pruning away the invalid governors using a first group of language-dependent axioms of dependency structure.

35. The method according to claim 34, wherein the first group of axioms comprises a first axiom that each word depends on one and only one word in the same sentence and a second axiom that a word used as a conjunction or preposition cannot be a leaf of a dependency tree.

36. The method according to claim 34, comprising selecting a plurality of most likely dependency trees from the pruned forest of dependency trees using an enhanced Viterbi algorithm.

37. The method according to claim 36, comprising selecting as the most probable dependency structure that dependency tree which satisfies a second group of language independent axioms of dependency structure.

38. The method according to claim 37, wherein the second group of axioms comprises a third axiom that dependency structure is non-cyclic, a fourth axiom that dependency structure is non-crossing and a fifth axiom that a sentence can have at most one main verb.

39. The method according to claim 33 comprising extracting noun phrases from the input sentence after tagging of the input sentence prior to generating the parse forest.

40. An apparatus for automatically translating a first natural language into a second language, comprising:

a converter for converting a spoken or written text in the first language into electrical signals representing the spoken or written words;

a means for rendering the text into sentences;

an automatic parsing machine for processing each sentence to generate a dependency parse tree for the sentence comprising a coder defining a set of coded tags each corresponding to a respective part-of-speech of a word in a sentence of the language; a corpus-based statistical tool having statistical parameters determined from a corpus of sentence dependency structures formed by annotating with the corresponding coded tags the words in each sentence of a set of sentences having respective exemplary dependency structures; a tagger for tagging the words of a sentence to be parsed with the corresponding coded tags to obtain a sequence of coded tags representing the input sentence; a processor for applying the corpus-based statistical tool to the sequence of coded tags to derive therefrom the most probable dependency structure for the input sentence and to generate a dependency parse tree of the sentence from the derived dependency structure and the words of the input sentence;

a synthesizer for synthesizing a sentence in the second language based on the words and the derived dependency tree of the sentence in the first language; and a reproduction device for audibly or visually reproducing the synthesized sentence in the second language.

41. The machine according to claim 40, comprising an analyzer for rendering electric signals representing input text in the language into paragraphs and sentences and for tokenising the sentences into strings of words.

42. The machine according to claim 40, comprising a first corpus memory storing a part-of-speech corpus consisting of words in the language associated with a corresponding coded tags; and a statistical tagger for tagging the words of the input sentence using the part-of-speech corpus.

43. The machine according to claim 42, wherein the statistical tagger is based on a first-order hidden Markov model.

44. The machine according to claim 42, comprising a dynamic context algorithm for assigning a most probable coded tag to an unknown word not contained in the part-of-speech corpus.

45. The machine according to claim 40, wherein the corpus-based statistical tool for determining the most probable dependency structure includes a first-order double layer hidden Markov model.

46. The machine according to claim 45, wherein a dynamic context algorithm is used to nominate candidate governors and generate a parse forest of dependency parse trees from which invalid candidate governors are pruned away, the most probable dependency structure being selected from the remaining dependency trees.

47. The machine according to claim 46, wherein the invalid governors are pruned away using a first group of language-independent axioms of dependency structure.

48. The machine according to claim 47, wherein the first group of axioms comprises a first axiom that each word depends on one and only one word in the same sentence and a second axiom that a word used as a conjunction or preposition cannot be a leaf of a dependency tree.

49. The machine according to claim 47, wherein a plurality of most likely dependency trees are selected from the pruned forest of dependency trees using an enhanced Viterbi algorithm.

50. The machine according to claim 49, wherein the most probable dependency structure is selected from the plurality of most likely dependency trees as being that dependency tree which satisfies a second group of language-independent axioms of dependency structure.

51. The machine according to claim 50, wherein the second group of axioms comprises a third axiom that dependency structure is non-cyclic, a fourth axiom that dependency structure is non-crossing and a fifth axiom that a sentence can have at most the main verb.

52. The machine according to claim 46, wherein noun phrases are extracted from the input sentence after tagging of the input sentence and prior to generating the parse forest.

* * * * *